United States Patent
Wirtz

(10) Patent No.: US 12,304,500 B2
(45) Date of Patent: May 20, 2025

(54) METHOD FOR OPERATING A VEHICLE

(71) Applicant: MERCEDES-BENZ GROUP AG, Stuttgart (DE)

(72) Inventor: Rene Wirtz, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/852,034

(22) PCT Filed: Mar. 23, 2023

(86) PCT No.: PCT/EP2023/057445
§ 371 (c)(1),
(2) Date: Sep. 27, 2024

(87) PCT Pub. No.: WO2023/186688
PCT Pub. Date: Oct. 5, 2023

(65) Prior Publication Data
US 2025/0108812 A1    Apr. 3, 2025

(30) Foreign Application Priority Data
Mar. 31, 2022   (DE) ............. 10 2022 001 116.6

(51) Int. Cl.
*B60W 40/08*   (2012.01)
*B60W 30/14*   (2006.01)
(Continued)

(52) U.S. Cl.
CPC .......... *B60W 40/08* (2013.01); *B60W 30/146* (2013.01); *B60W 50/12* (2013.01);
(Continued)

(58) Field of Classification Search
CPC .... B60W 40/08; B60W 30/146; B60W 50/12; B60W 50/14; B60W 2040/0809;
(Continued)

(56) References Cited

U.S. PATENT DOCUMENTS 10,625,673 B2 * 4/2020 Shibata ................ B60K 35/28
11,479,258 B1 * 10/2022 Sanchez ............... A61B 5/6826
(Continued)

FOREIGN PATENT DOCUMENTS

| CN | 108839658 A | 11/2018 |
| CN | 110696834 A | 1/2020 |

(Continued)

OTHER PUBLICATIONS

International Search Report and Written Opinion dated Jul. 3, 2023 in related/corresponding International Application No. PCT/EP2023/057445.

(Continued)

*Primary Examiner* — Mohamed Barakat
(74) *Attorney, Agent, or Firm* — PATENT PORTFOLIO BUILDERS PLLC

(57) ABSTRACT

Operation of a vehicle involves determining a cortisol content in the blood of a driver of the vehicle. The cortisol content in the blood of the driver is derived using a cortisol content in the sweat of the driver, detected sensorially by a wearable data processing unit. Depending on the derived cortisol content of the driver, settings of vehicle parameters and/or vehicle functions are adjusted to reduce the risk of an accident.

9 Claims, 1 Drawing Sheet

(51) Int. Cl.
 *B60W 50/00* (2006.01)
 *B60W 50/12* (2012.01)
 *B60W 50/14* (2020.01)

(52) U.S. Cl.
 CPC ..... *B60W 50/14* (2013.01); *B60W 2040/0809* (2013.01); *B60W 2040/0872* (2013.01); *B60W 2050/0083* (2013.01); *B60W 2050/146* (2013.01); *B60W 2540/043* (2020.02); *B60W 2540/22* (2013.01); *B60W 2540/221* (2020.02); *B60W 2554/802* (2020.02)

(58) Field of Classification Search
 CPC . B60W 2040/0872; B60W 2050/0083; B60W 2050/146; B60W 2540/043; B60W 2540/22; B60W 2540/221; B60W 2554/802
 See application file for complete search history.

(56) References Cited

U.S. PATENT DOCUMENTS

| | | | | |
|---|---|---|---|---|
| 2003/0097047 | A1* | 5/2003 | Woltermann | G01C 21/3697 600/300 |
| 2014/0221781 | A1* | 8/2014 | Schrauf | A61B 5/6893 600/301 |
| 2015/0175169 | A1* | 6/2015 | Flehmig | B62D 6/00 701/1 |
| 2018/0146898 | A1 | 5/2018 | Begtrup et al. | |
| 2018/0345985 | A1* | 12/2018 | Lindelöf | B60W 40/09 |
| 2019/0049957 | A1 | 2/2019 | Healey et al. | |
| 2020/0070840 | A1* | 3/2020 | Gunaratne | B60K 28/06 |
| 2020/0334762 | A1* | 10/2020 | Carver | G07C 5/0825 |
| 2021/0024078 | A1 | 1/2021 | Dede | |
| 2021/0309232 | A1* | 10/2021 | Goto | G06V 20/58 |

FOREIGN PATENT DOCUMENTS

| | | |
|---|---|---|
| DE | 102012112802 A1 | 6/2014 |
| DE | 102017212535 A1 | 6/2018 |
| DE | 102018218307 A1 | 4/2020 |
| DE | 102019200597 A1 | 4/2020 |
| DE | 102019204691 A1 | 10/2020 |
| DE | 102019204786 A1 | 10/2020 |
| DE | 112019001733 T5 | 12/2020 |
| EP | 2711227 B1 | 5/2019 |
| WO | 2020200862 A1 | 10/2020 |

OTHER PUBLICATIONS

Legner et al.; "Sweat sensing in the smart wearables era: Towards integrative, multifunctional and boy-compliant perspiration analysis;" Sensors and Actuators A; Physical; Sep. 2019; pp. 200-221.
Office Action created Oct. 14, 2022 in related/corresponding DE Application No. DE 10 2022 001 116.6.
Office Action dated Feb. 27, 2025 in related/corresponding CN Application No. 202380032416.9.

* cited by examiner

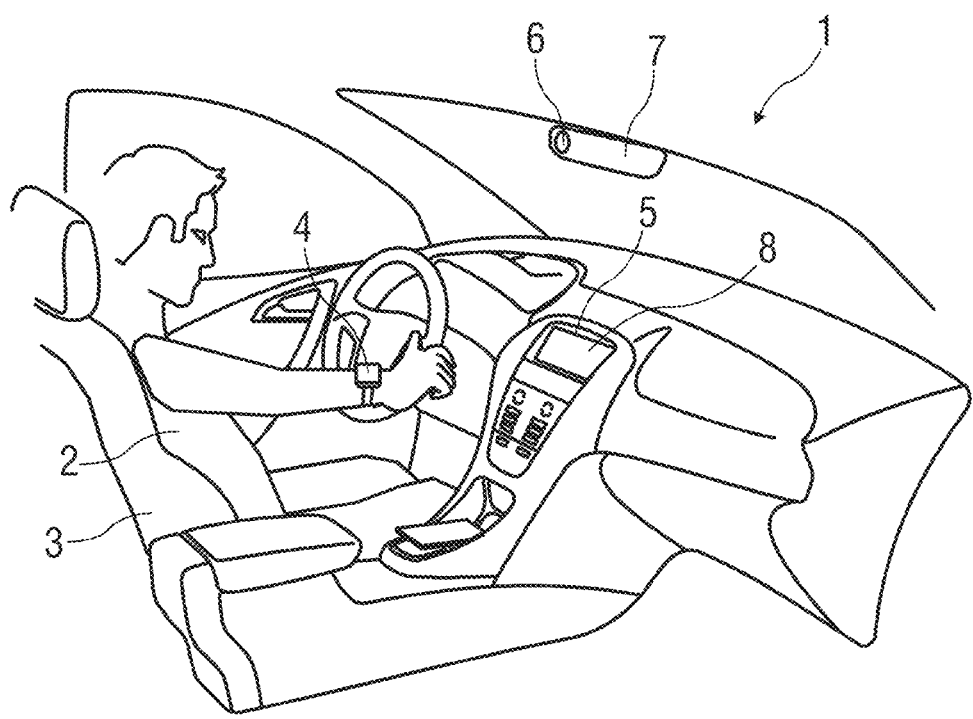

METHOD FOR OPERATING A VEHICLE

BACKGROUND AND SUMMARY OF THE INVENTION

Exemplary embodiments of the invention relate to a method for operating a vehicle, wherein a cortisol content in the blood of a driver of the vehicle is determined.

A method for adjusting a control algorithm having a driver-dependent parameter is known from EP 2 711 227 B1. The control algorithm regulates a transmission system in a vehicle. The method provides for measuring a physical property of the driver, determining a stress level of the driver based on the executed measurement, and adjusting the control algorithm to the determined stress level of the driver. Furthermore, the method is characterized by adjustment of the control algorithm, which comprises extending a permissible speed range before a gear change takes place, wherein this extension is proportional to the determined stress level of the driver. The measured physical property of the driver comprises a blood cortisol level and an amount of secreted hand sweat.

Exemplary embodiments of the invention are directed to a method for operating a vehicle.

According to the invention, a method for operating a vehicle, wherein a cortisol content in the blood of the driver is determined, provides that the cortisol content in the blood of the driver is derived using a cortisol content in the sweat of the driver, detected sensorially by means of a wearable data processing unit and, depending on the derived cortisol content of the driver, settings of vehicle parameters and/or vehicle functions are adjusted in order to reduce the risk of an accident.

By using the method, a risk of an accident, in particular for a comparatively young driver of the vehicle, can be reduced and therefore road safety can be increased. Comparatively young novice drivers having a relatively low cortisol content have a significantly higher risk of being involved in an accident than their peers having a relatively high blood cortisol content.

Cortisol is a stress hormone in the body of mammals and thus also of people. Cortisol increases concentration and performance and protects the body from inflammation. The release of cortisol helps the body to stay alert and perform well in relatively extreme situations. Therefore, it can be concluded that a driver of a vehicle, in particular a comparatively young driver without significant driving experience, who has a relatively low cortisol content or cortisol level in their blood is less alert and performs worse. The accident risk for this driver can thus accordingly be high.

The cortisol content in sweat can be determined using signals detected by the wearable data processing unit, in particular a so-called sweat tracker. It is therefore a non-invasive measurement of the cortisol content in the driver's sweat. A sweat tracker can be integrated, for example, into a so-called fitness tracker or into a smartwatch. A determined cortisol content in the sweat and also in the blood allows conclusions to be drawn about the stress levels of a person wearing the data processing unit.

Furthermore, a hazard level for a risk of an accident involving the driver can be determined using the derived cortisol content in the blood of the driver and a determined level of driving experience of the driver. This means that if a comparatively low cortisol content is determined in the driver's blood and the driver has comparatively little driving experience, the hazard level in relation to the accident risk is comparatively high. If, however, a comparatively high cortisol content is determined and the driver has a relatively large amount of driving experience, then it is assumed that the hazard level is comparatively low and thus there is a lower risk of the driver of the vehicle being involved in an accident. For example, the level of driving experience can be determined by requesting a date of birth and/or a date of issue of a driving license of the driver of the vehicle. The driver of the vehicle can then be given the option of manually performing a corresponding entry. Alternatively, or additionally, the driver of the vehicle can be prompted to have to position their driving license relative to a vehicle camera so that required data can be detected and thus the level of driving experience of the driver can be derived.

One embodiment of the method provides that as settings of vehicle parameters and/or vehicle functions, depending on the respectively determined hazard level, a maximum speed for a further driving operation of the vehicle is specified, a maximum possible acceleration is limited, a warning is output in the vehicle when a distance, which is greater that a minimum target distance, between the vehicle and a vehicle driving in front is not met, a warning is output when the vehicle prematurely leaves a current lane and an intervention limit for a lane departure warning system for a steering intervention is lowered, and/or a selecting a sport driving mode is prevented.

This adjustment of the settings of vehicle parameters and/or vehicle functions is intended, in particular, to prevent the driver actually provoking an accident or being involved in an accident due to inattention when a comparatively high hazard level has been determined. By adjusting the settings, a risk of the driver of the vehicle being involved in an accident is reduced.

In a further development of the method, the driver is identified in the vehicle using their sweat. For this purpose, initially sweat data of the driver is stored so that the driver can be identified by comparing detected and stored sweat data. By detecting the sweat using the wearable data processing unit and comparing it with stored data, it is possible to automatically identify the driver without the driver of the vehicle having to enter any identification.

A further possible embodiment of the method provides that detected sweat data of the driver is transmitted to a computing unit in the vehicle for evaluation and processing. Thus, the sweat data is available to the vehicle, whereby the driver can be identified and their blood cortisol content can be determined with regard to an accident risk.

If, in a possible further development, the vehicle is one that has different drivers, a database of potential drivers of the vehicle is stored in the computing unit. In particular, all of the potential drivers of the vehicle are stored in the database and can be identified via their sweat data stored in the vehicle and detected sweat data. In addition, before the start of a journey, a cortisol content in the sweat of each potential driver can be determined. Depending on the determined hazard level, changes can then if necessary be made accordingly to the settings of vehicle parameters and/or vehicle functions before the start of a journey in order to reduce the accident risk for the driver.

In one possible development, a date of birth of the respective potential driver and personal sweat data for identifying the respective potential driver are stored in the database. In particular, using the date of birth of the respective potential drivers of the vehicle, the level of driving experience can be derived and automatically taken into account when determining the hazard level.

In a further possible development of the method, the respective potential driver is registered in the database by means of an electronically readable driving license the first time their sweat data is detected. Thus, the driver is stored as a potential driver of the vehicle and can be uniquely identified using their sweat. In addition, a cortisol content in the blood of the driver can be derived from the detected cortisol content in the sweat of the driver and a hazard level for an accident risk can be determined. Depending on the determined hazard level, settings of vehicle parameters and/or vehicle functions, relating in particular to safety, are adjusted if necessary.

In one possible embodiment, the level of driving experience of the driver can be determined using a date of issue of the driving license. If the respective potential driver of the vehicle has an electronically readable driving license, then the level of driving experience of the driver can be automatically derived from an electronically readable date of issue of the driving license.

Furthermore, one embodiment provides that all of the changes undertaken in relation to the settings of the vehicle parameters and/or vehicle functions as well as a determined current cortisol content in the sweat and/or blood of the driver are shown to the respective driver of the vehicle on a display unit of the vehicle. This gives the driver an overview of their cortisol content and the associated changes to the settings of the vehicle parameters and/or vehicle functions, in particular to increase their safety and the safety of road users in the vicinity of the vehicle.

BRIEF DESCRIPTION OF THE SOLE DRAWING

Exemplary embodiments of the invention are explained in more detail in the following using a drawing, in which:

The sole drawing schematically shows in a perspective view, a section of a vehicle having a driver on a driver's seat.

DETAILED DESCRIPTION

The single FIGURE shows a perspective view of a section of a vehicle 1 having a driver 2 on a driver's seat 3 of the vehicle 1.

In general, it is known that a traffic accident is the most frequent cause of death in the 16 to 29-year-old age group. Comparatively young novice drivers having a relatively low cortisol content, i.e., relatively low cortisol levels, in their blood have a significantly higher risk of being involved in an accident than their peers having a relatively high cortisol level.

Cortisol is a stress hormone and is released by mammals, in particular when under stress, and can be detected in the sweat. Releasing cortisol increases concentration and performance levels and protects the body from inflammation. A release of cortisol helps the body to stay alert and perform well in comparatively extreme situations.

In order to reduce the accident risk for a driver 2 of a vehicle 1, a method is described below.

The method provides a non-invasive measurement of the cortisol content in the sweat of a driver 2 of the vehicle 1. In particular, the measurement takes place by means of a wearable data processing unit 4, which can be referred to as a sweat tracker. For example, the sweat tracker is integrated into a fitness tracker or a smartwatch of the driver 2. In one possible embodiment of the method, it can be provided that the wearable data processing unit 4 permanently remains in the vehicle 1 and must be put on by a respective driver 2 before departure.

A cortisol content in the blood of the driver 2 can be derived using the detected cortisol content in the sweat of the driver 2. Depending on the detected cortisol content in the sweat and/or the detected cortisol content in the blood of the driver 2, settings of vehicle parameters and/or vehicle functions are adjusted in order to reduce the risk of an accident.

Detected sweat data of the driver 2 is transmitted from the data processing unit 4 to a computing unit 5 of the vehicle 1 for evaluation and processing, i.e., to a so-called vehicle computer, in particular without contact, for example via a standardized radio connection.

The computing unit 5 includes a database with all of the potential drivers 2 who are authorized to drive the vehicle 1. Personal sweat data and also a date of birth of the respective potential driver 2 are stored in the database, in addition to the identification of the respective driver 2. For example, it is necessary that the respective driver 2 is registered to the vehicle 1, for which purpose an electronically readable driving license can be used. In particular, the driver 2 is registered the first time their sweat is measured. To identify the respective driver 2 in the vehicle 1, the sweat data is compared with the database by means of a machine learning algorithm.

As an alternative to, or in addition to, using the electronically readable driving license to register themselves to the vehicle, the respective driver 2 can manually enter their date of birth and/or a date of issue of the driving license.

A further alternative or additional embodiment provides that the driving license, in particular the information noted on it, is determined using image signals detected by a vehicle camera 6 which, according to the present exemplary embodiment, is integrated into a rear-view mirror 7 of the vehicle 1. To do this, the driver 2 has to position their driving license in front of the vehicle camera 6 so that the data can be detected by means of the latter. By means of image recognition, the detected image signals are evaluated and the data, i.e., the date of birth and/or the date of issue, is recognized and recorded in the database to register the driver 2.

Using the registration, it is possible to assign sweat data detected by means of the data processing unit 4 to the corresponding driver 2 and thus also a date of birth and an age.

In particular, using the age and a date of issue of the driving license of the driver 2, the level of driving experience can be derived. The derived level of driving experience and the determined cortisol content, in particular in the blood of the driver 2, are used to determine a hazard level for the driver 2, in particular a comparatively young novice driver. The lower the cortisol content and the lower the level of driving experience of the driver 2, the higher the hazard level assigned to them is.

Depending on the determined hazard level, in particular depending on how high a determined hazard level is, the settings of the vehicle parameters and/or vehicle functions are adjusted.

In particular, depending on the determined hazard level, a maximum possible driving speed for driving the vehicle 1 is specified. In particular, it is provided that the higher the hazard level, the earlier a drive train of the vehicle 1 is controlled with regard to the maximum speed.

If the hazard level determined is relatively high, a maximum possible acceleration of the vehicle 1 is limited. The option to carry out a so-called kickdown start when starting the vehicle 1 is completely prevented above a specified hazard level.

With regard to the use of speed-dependent distance control of the vehicle 1, it is provided that a warning is output to the driver 2 if a relatively high hazard level is determined and the distance between the vehicle and a vehicle driving in front falls below a predefined distance. This predefined distance is greater than a minimum target distance, i.e., in particular a safety distance adapted to the travelling speed of the vehicle 1. The warning is output when the vehicle 1 approaches the vehicle driving in front, preventing the vehicle 1 from tailgating the vehicle in front as much as possible.

If the vehicle 1 is equipped with a lane departure warning system and if a relatively high hazard level is determined, a warning is output even if the vehicle 1 leaves a current lane comparatively early. In addition, an intervention limit of the lane departure warning system is lowered, in which case an automatic steering intervention takes place to position the vehicle 1 in relation to its lane.

For example, if a relatively high hazard level is determined for the current driver 2 of vehicle 1, a warning can be output for other vehicles that are in a lane into which vehicle 1 intends to merge, even if they are comparatively far away from vehicle 1. Predictive speed regulation can also be more effective if a relatively high hazard level is determined, especially if map data indicates that bends, junctions and/or roundabouts are ahead of vehicle 1.

It is also conceivable that the sensitivity of an attention assistant of the vehicle 1 is increased depending on the hazard level, so that a relatively low cortisol content in the sweat and blood of the endangered driver 2 warns the driver even if they are exhibiting comparatively little sign of fatigue.

Furthermore, the method provides that in the case that the driver 2 has a selection of driving modes available to them, the option to select a sport driving mode is prevented.

All changes made to the settings of the vehicle parameters and/or vehicle functions are shown to the driver 2 of the vehicle 1 on a display unit 8.

In one possible embodiment of the method, it is possible that an immobilizer is integrated into the vehicle 1. The immobilizer can be activated, for example, by the parents of the driver 2, a car rental service, a manager of a company fleet, and/or via remote access by an insurer. For this purpose, it is provided that a drive unit of the vehicle 1 can only be switched on when the driver 2 of the vehicle 1 is wearing the wearable data processing unit 4. For example, the wearable data processing unit 4 is assigned to this vehicle 1, it remains in said vehicle and must be put on by the respective driver 2, who is authorized to drive the vehicle 1, before starting a driving operation.

As an alternative to the fact that the drive unit of the vehicle 1 can only be switched on when the data processing unit 4 is being worn, it is provided that the vehicle 1 can only be operated by the driver 2 at a maximum hazard level when the data processing unit 4 is not being worn or is faulty. The vehicle 1 can therefore be moved even if the data processing unit 4 does not function or functions incorrectly.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle, the method comprising:
   determining a cortisol content in blood of a driver of the vehicle using a cortisol content in sweat of the driver, wherein the cortisol content in sweat of the driver is detected sensorially by a wearable data processing unit;
   adjusting, depending on the determined cortisol content in the driver, settings of parameters of the vehicle or functions of the vehicle functions to reduce a risk of an accident; and
   determining a hazard level for the risk of an accident involving the driver using the determined cortisol content in the blood of the driver and a determined level of driving experience of the driver.

2. The method of claim 1, wherein, depending on the determined hazard level, the settings of the parameters of the vehicle or the functions of the vehicle are adjusted by
   specifying a maximum speed for a further driving operation of the vehicle,
   limiting a maximum possible acceleration of the vehicle,
   outputting a warning in the vehicle when a distance, which is greater than a minimum target distance, between the vehicle and a vehicle driving in front is not met,
   outputting a warning when the vehicle prematurely leaves a current lane and an intervention limit for a lane departure warning system for a steering intervention is lowered, or
   preventing selection of a sport driving mode.

3. The method of claim 1, further comprising:
   identifying the driver in the vehicle using the driver's sweat.

4. The method of claim 1, further comprising:
   transmitting detected sweat data of the driver to a computing unit in the vehicle for evaluation and processing.

5. The method of claim 4, wherein a database of potential drivers of the vehicle is stored in the computing unit.

6. The method of claim 5, wherein a date of birth of a respective one of the potential drivers and personal sweat data for identifying the respective one of the potential drivers are stored in the database.

7. The method of claim 6, wherein the respective one of the potential drivers is registered in the database by an electronically readable driving license the first time the sweat data of the respective one of the potential drivers is detected.

8. The method of claim 7, wherein the level of driving experience of the driver is determined using a date of issue of the driving license.

9. The method of claim 1, wherein all changes undertaken related to the settings of the parameters of the vehicle parameters or the functions of the vehicle, as well as a determined current cortisol content in the sweat or blood of the driver are shown to the driver of the vehicle on a display unit of the vehicle.

* * * * *